(12) United States Patent
Masuda

(10) Patent No.: US 8,881,627 B2
(45) Date of Patent: Nov. 11, 2014

(54) WORKPIECE SUPPLY/CONVEYANCE DEVICE AND MACHINE TOOL WITH THE WORKPIECE SUPPLY/CONVEYANCE DEVICE

(75) Inventor: Masaaki Masuda, Kitasaku-gun (JP)

(73) Assignee: Citizen Machinery Co., Ltd., Kitasaku-Gun, Nagano (JP)

( * ) Notice: Subject to any disclaimer, the term of this patent is extended or adjusted under 35 U.S.C. 154(b) by 1360 days.

(21) Appl. No.: 12/452,212

(22) PCT Filed: Jun. 16, 2008

(86) PCT No.: PCT/JP2008/061007
§ 371 (c)(1),
(2), (4) Date: Dec. 22, 2009

(87) PCT Pub. No.: WO2008/156068
PCT Pub. Date: Dec. 24, 2008

(65) Prior Publication Data
US 2010/0101384 A1    Apr. 29, 2010

(30) Foreign Application Priority Data
Jun. 21, 2007    (JP) .................................. 2007-163648

(51) Int. Cl.
| | | |
|---|---|---|
| B23B 13/10 | (2006.01) | |
| B23B 15/00 | (2006.01) | |
| B23Q 7/02 | (2006.01) | |
| B23Q 1/52 | (2006.01) | |
| B23Q 7/04 | (2006.01) | |

(52) U.S. Cl.
CPC .. B23Q 7/02 (2013.01); B23Q 1/52 (2013.01); B23Q 7/048 (2013.01)
USPC .............................................. 82/124; 82/129

(58) Field of Classification Search
CPC .......... B23B 15/00; B23B 13/00; B23B 13/10
USPC .................................... 82/124–127, 102, 129
See application file for complete search history.

(56) References Cited

U.S. PATENT DOCUMENTS

| | | | | |
|---|---|---|---|---|
| 3,757,927 A | * | 9/1973 | Gable et al. | ................. 198/463.5 |
| 3,821,835 A | * | 7/1974 | St. Andre et al. | ................. 29/36 |

(Continued)

FOREIGN PATENT DOCUMENTS

| | | | |
|---|---|---|---|
| JP | 58066603 A | * | 4/1983 |
| JP | S58-155196 A | | 9/1983 |

(Continued)

*Primary Examiner* — Andrea Wellington
*Assistant Examiner* — Sara Addisu
(74) *Attorney, Agent, or Firm* — Manabu Kanesaka

(57) ABSTRACT

There is provided a workpiece supply/conveyance device that can remove a workpiece from a spindle and supply another workpiece to the spindle smoothly and in a short time. A workpiece holding section of one of a plurality of arms includes an unmachined workpiece holding section 29 for holding an unmachined workpiece and a machined workpiece holding section 21 for holding a machined workpiece. When the plurality of arms are rotated in one direction, each of the arms is moved to an unmachined workpiece loading position III at which the unmachined workpiece holding section receives the unmachined workpiece, a standby position IV in a standby state while holding the unmachined workpiece to be next machined in the unmachined workpiece holding section, a workpiece delivery/reception position I at which the workpiece is delivered and received among a workpiece machining apparatus, the unmachined workpiece holding section and the machined workpiece holding section, and a machined workpiece unloading position II at which the machined workpiece held in the machined workpiece holding section is unloaded.

12 Claims, 10 Drawing Sheets

(56) References Cited

U.S. PATENT DOCUMENTS

| | | | | |
|---|---|---|---|---|
| 4,787,280 A | * | 11/1988 | Voelkerding | 82/124 |
| 5,222,285 A | * | 6/1993 | Horikawa | 29/33 P |
| 5,662,014 A | * | 9/1997 | Link | 82/125 |
| 5,782,151 A | * | 7/1998 | Shiramasa | 82/124 |
| 5,896,793 A | * | 4/1999 | Haller et al. | 82/126 |
| 5,911,803 A | * | 6/1999 | Miyano | 82/1.11 |
| 6,302,003 B1 | * | 10/2001 | Haller et al. | 82/1.11 |
| 6,637,097 B2 | * | 10/2003 | Miyano | 29/564 |
| 6,843,622 B2 | * | 1/2005 | DeMint et al. | 409/138 |
| 7,748,302 B2 | * | 7/2010 | Kato | 82/124 |
| 8,529,419 B2 | * | 9/2013 | Kawasumi et al. | 483/14 |

FOREIGN PATENT DOCUMENTS

| | | | | |
|---|---|---|---|---|
| JP | 58192703 A | * | 11/1983 | |
| JP | S58-206303 A | | 12/1983 | |
| JP | 60146601 A | * | 8/1985 | |
| JP | S61-75901 U | | 5/1986 | |
| JP | S63-107501 U | | 7/1988 | |
| JP | 63295102 A | * | 12/1988 | |
| JP | S64-34139 U | | 3/1989 | |
| JP | 06000746 A | * | 1/1994 | |
| JP | 2001105203 A | * | 4/2001 | |
| JP | 2005118942 A | * | 5/2005 | |

* cited by examiner (a)

(b)

(a)

(b)

(a)

(b)

WORKPIECE SUPPLY/CONVEYANCE DEVICE AND MACHINE TOOL WITH THE WORKPIECE SUPPLY/CONVEYANCE DEVICE

TECHNICAL FIELD

The present invention relates to a workpiece supply/conveyance device which delivers and receives a workpiece to and from a workpiece machining apparatus such as a machine tool, and a machine tool including this workpiece supply/conveyance device.

BACKGROUND ART

A machine tool is known which machines a workpiece attached to a spindle by using a tool disposed on a tool rest which can relatively move with respect to the spindle or a table. Among such machine tools, there is known a machine tool including a workpiece supply/conveyance device which automatically convey a machined workpiece from the spindle and automatically supplies an unmachined workpiece to the spindle.

A workpiece supply/conveyance device of a machine tool disclosed in Patent Document 1 includes a plurality of arms radially expanding from a common rotation center. Each arm is integrally rotated around the rotation center as a supporting point, and a position of each arm is sequentially switched to a machined workpiece conveying position, a workpiece supply position, a standby position, and a workpiece delivery/reception position facing the spindle, whereby an unmachined workpiece is prepared and delivered to the spindle, and a machined workpiece is received from the spindle and then conveyed.

Further, a loading device disclosed in Patent Document 2 includes four arms which rotate in forward and reverse directions simultaneously performs an operation of delivering an unmachined workpiece from an arm A to one of two spindles arranged in parallel when the four arms are placed at predetermined positions, an operation of delivering a half-machined workpiece to the other spindle from an arm B, and an operation of delivering the half-machined workpiece to an arm C, and then simultaneously carries out the loading of the unmachined workpiece to the arm A and the unloading of a machined workpiece from an arm D, when the four arms are integrally rotated to be placed at next predetermined positions.

However, in the workpiece supply/conveyance device disclosed in each of Documents 1 and 2, the workpiece loading arm which delivers the unmachined workpiece to the spindle and the workpiece unloading arm which receives the machined workpiece from the spindle are separately disposed. Therefore, after the workpiece unloading arm has received the machined workpiece from the spindle, until the workpiece loading arm which holds an unmachined workpiece rotates to a position where it faces the spindle, a long time is required, and hence there is a problem that a cycle time is prolonged.

Patent Document 1: Japanese Patent Application Laid-open No. 155196-1983

Patent Document 2: Japanese Patent Application Laid-open No. 75901-1986

DISCLOSURE OF THE INVENTION

Problem to be Solved by the Invention

The present invention has been developed in view of the above-described problem. An object of the present invention is to provide a workpiece supply/conveyance device which can load and unload a workpiece in a simple constitution and can further curtail a cycle time, and another object thereof is to provide a machine tool including this workpiece supply/conveyance device.

Means for Solving the Problem

To achieve the above objects, there is provided a workpiece supply/conveyance device which includes a plurality of arms radially extending from a rotation center, integrally rotates the plurality of arms around a rotation center, and places a workpiece holding section of one arm in the plurality of arms at a workpiece delivery/reception position to deliver/receive the workpiece between a workpiece machining apparatus and the workpiece holding section, wherein the workpiece holding section includes an unmachined workpiece holding section that holds an unmachined workpiece and a machined workpiece holding section that holds a machined workpiece, and the plurality of the arms are integrally rotated in one direction to move each of the arms to an unmachined workpiece loading position at which the unmachined workpiece is received by the unmachined workpiece holding section, a standby position which is in a standby mode while holding the unmachined workpiece to be next machined in the unmachined workpiece holding section, a workpiece delivery/reception position at which the workpiece is delivered and received among the workpiece machining apparatus, the unmachined workpiece holding section and the machined workpiece holding section, and a machined workpiece unloading position at which the machined workpiece held in the machined workpiece holding section is unloaded.

In this case, the unmachined workpiece holding section and the machined workpiece holding section of the workpiece holding section are arranged in close proximity to each other on a common circumference having the rotation center as the center, and the arm is rotated in one direction when placed at the workpiece delivery/reception position, whereby the arm may be moved between a machined workpiece reception position at which the machined workpiece holding section receives the machined workpiece from the workpiece machining apparatus and an unmachined workpiece delivery position at which the unmachined workpiece holding section delivers the unmachined workpiece to the workpiece machining apparatus.

Further, when one of the plurality of arms is at the standby position, one of the plurality of other arms is at the unmachined workpiece loading position, and the workpiece supply/conveyance device may be provided with a loading device which supplies the unmachined workpiece to the arm placed at the unmachined workpiece loading position.

Furthermore, when one of the plurality of arms is at the standby position, one of the plurality of other arms is at the machined workpiece unloading position, and the workpiece supply/conveyance device may be provided with an unloading device which receives the machined workpiece from the arm placed at the machined workpiece unloading position and unloads the same.

The plurality of loading devices may be provided in a path along which the arm moves from the machined workpiece unloading position to the standby position.

In the present invention, a position of the arm may be shifted in the order of the unmachined workpiece loading position, the standby position, the workpiece delivery/reception position, and the machined workpiece unloading position.

A machine tool of the present invention comprises a spindle which holds a workpiece; a tool rest having a tool to machines the workpiece held by the spindle; and a workpiece supply/conveyance device which delivers and receives the workpiece to and from the spindle. The workpiece supply/conveyance device comprises a plurality of arms radially extending from a rotation center, and an unmachined workpiece holding portion to hold an unmachined workpiece and a machined workpiece holding section to hold a machined workpiece which are provided to each of the arms, and the plurality of the arms are integrally rotated in one direction to move each of the arms to an unmachined workpiece loading position at which the unmachined workpiece is received by the unmachined workpiece holding section, a standby position which is in a standby mode while holding the unmachined workpiece to be next machined in the unmachined workpiece holding section, a workpiece delivery/reception position at which the workpiece is delivered and received among the workpiece machining apparatus, the unmachined workpiece holding section and the machined workpiece holding section, and a machined workpiece unloading position at which the machined workpiece held in the machined workpiece holding section is unloaded.

In this case, the unmachined workpiece holding section and the machined workpiece holding section of the workpiece holding section are arranged in close proximity to each other on a common circumference having the rotation center as the center, and the arm is rotated in one direction when placed at the work delivery/reception position, whereby the arm may be moved between a machined workpiece reception position at which the machined workpiece holding section receives the machined workpiece from the workpiece machining apparatus and an unmachined workpiece delivery position at which the unmachined workpiece holding section delivers the unmachined workpiece to the workpiece machining apparatus.

Further, when one of the plurality of arms is at the standby position, the workpiece grasped by the spindle is preferably machined.

Furthermore, when one of the plurality of arms is at the standby position, one of the plurality of other arms is at the unmachined workpiece loading position, and the machine tool may be provided with a loading device which supplies the unmachined workpiece to the arm placed at the unmachined workpiece loading position.

In addition, when one of the plurality of arms is at the standby position, one of the plurality of other arms is at a machined workpiece unloading position, and the machine tool may be provided with an unloading device which receives the machined workpiece from the arm placed at the machined workpiece unloading position and unloads the same.

Further, the plurality of loading devices may be provided in a path along which the arm moves from the machined workpiece unloading position to the standby position.

In this case, while different types of workpieces supplied from the plurality of loading devices are exchanged, the workpieces may be machined. Furthermore, in the present invention, a position of the arm is preferably shifted in the order of the unmachined workpiece loading position, the standby position, the workpiece delivery/reception position, and the machined workpiece unloading position.

As another embodiment of the machine tool according to the present invention, a tool is attached to the arm, and the workpiece may be machined by the tool with the aid of an swing operation of the arm.

Effect of the Invention

According to the thus constituted present invention, when the delivery/reception of the machined workpiece and the unmachined workpiece with respect to the spindle ends and the arm moves away from the spindle, the arm which holds an unmachined workpiece which is to be next machined can be set in a standby mode at a standby position near the spindle. Therefore, after the end of the machining of the workpiece on the spindle, the arm can be immediately rotated from the standby position to be placed at the workpiece delivery/reception position where it faces the spindle.

Furthermore, since the unmachined workpiece holding section and the machined workpiece holding section can be disposed on one arm in close proximity to each other, a relative distance between the spindle or the like and the arm can be minimized in a process of the reception of the machined workpiece from the spindle or the like to the delivery of the unmachined workpiece to the spindle or the like, which enables the curtailment of the cycle time.

In particular, the unmachined workpiece holding section and the machined workpiece holding section are disposed on one circumference (A), and hence the delivery/reception of the machined workpiece and the unmachined workpiece between the spindle or the like and the arm is possible by the slight rotating operation only of the arm.

As explained above, the present invention can perform the unloading and the loading of the workpiece in a short time by a simple operation which is the rotation of the arm in one direction, and hence it has an effect that a time from the machining end to the machining start of a workpiece (a cycle time) in a workpiece machining apparatus such as a machine tool can be curtailed.

DESCRIPTION OF REFERENCE NUMERALS

Figure 1:
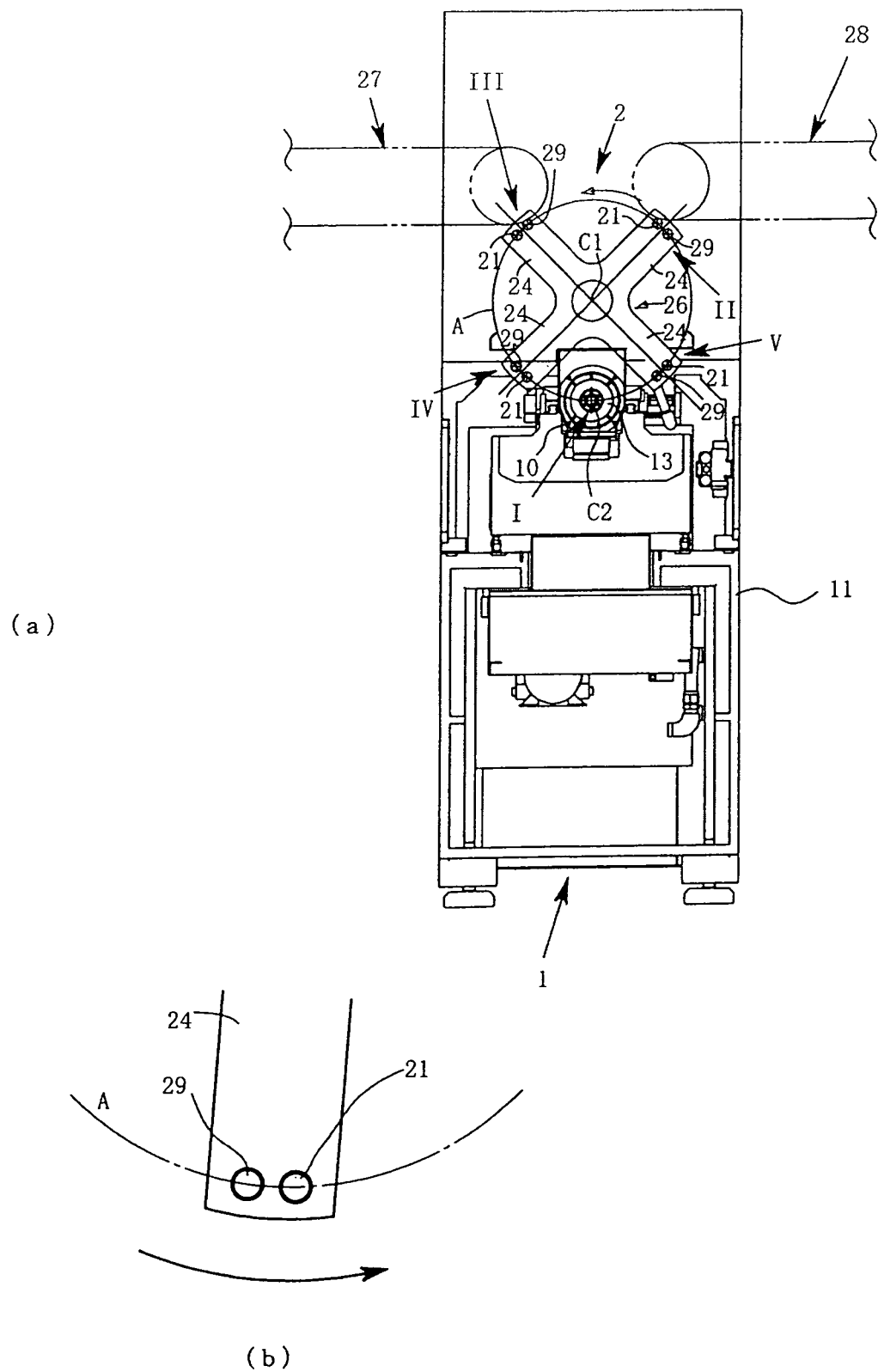
FIG. 1 show an embodiment of a machine tool including a workpiece supply/conveyance device according to the present invention, where (a) is a front view in which a tool rest is omitted and (b) is an enlarged view of an arm tip portion.

1: machine tool
10: spindle stock
13: spindle
2: workpiece supply/conveyance device
21: machined workpiece holding section
24, 240, 340: arm
26, 260, 360: arm body
27: loading device
28: unloading device
29: unmachined workpiece holding section

BEST MODE FOR CARRYING OUT THE INVENTION

Hereinafter, preferred embodiments of a workpiece supply/conveyance device and a machine tool including this workpiece supply/conveyance device according to the present invention will be described with reference to the accompanying drawings.

It is to be noted that the description will be given about a case where the workpiece supply/conveyance device according to the present invention is applied to a machine tool as an example of a workpiece machining apparatus in this embodiment.

FIRST EMBODIMENT

Figure 2:
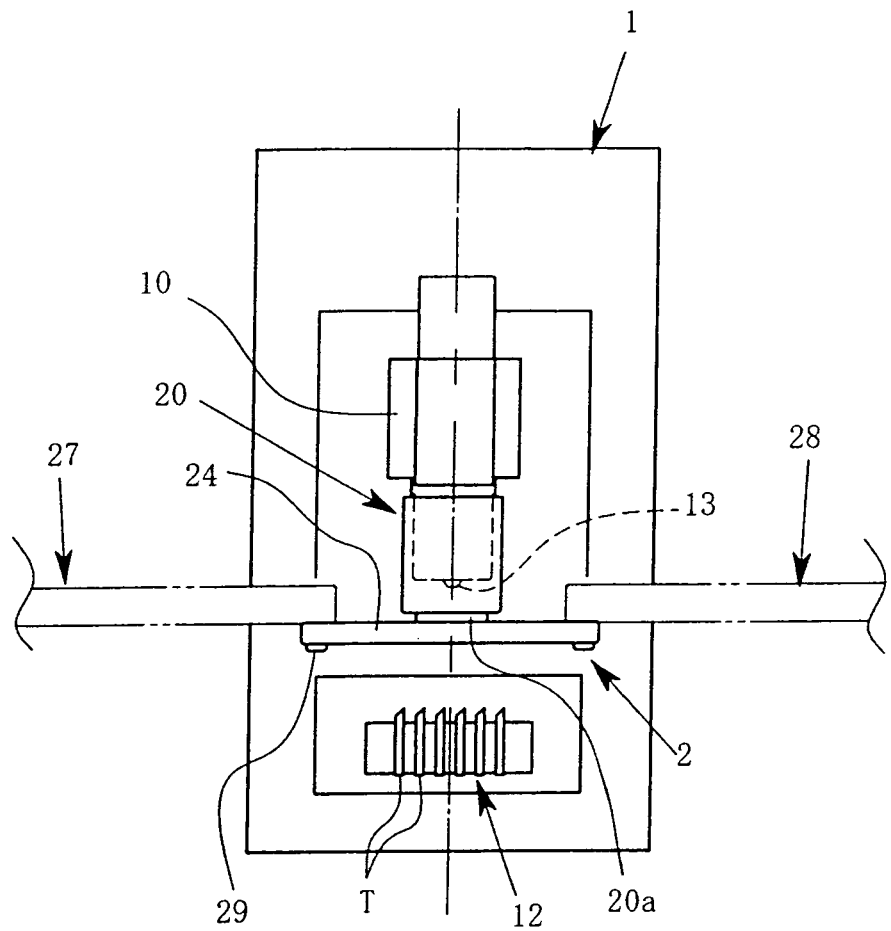
FIG. 2 is a plan view of the machine tool in FIG. 1.

FIG. 1 show an embodiment of a machine tool including a workpiece supply/conveyance device of the present invention, where (a) is a front view in which a tool rest is omitted and (b) is an enlarged view of an arm tip portion, and FIG. 2 is a plan view of the machine tool in FIG. 1.

[Constitution of Machine Tool]

As shown in FIG. 1(a) and FIG. 2, a machine tool 1 is provided on a pedestal 11, and it has a spindle stock 10 which can freely move forward and backward along a Z direction (a direction orthogonal to a page surface of FIG. 1), a spindle 13 which is rotatably supported on this spindle stock 10 and includes a chuck (not shown) that grasps a workpiece at a front end, and a comb-blade-like tool rest 12 which is arranged in front of the spindle 13 to face the same and has a plurality of tools T attached thereto. The workpiece grasped by the chuck is machined by the relative movement of the tool rest 12 and the spindle 13.

It is to be noted that the "relative movement" in this specification is a concept including a case where the spindle 13 moves with respect to the tool rest 12, a case where the tool rest 12 moves with respect to the spindle 13, and a case where both the spindle 13 and the tool rest 12 move.

[Constitution of Workpiece Supply/Conveyance Device]

The workpiece supply/conveyance device 2 is provided at a position where it does not interfere with the spindle 3, the tool rest 12, and the tools T. The workpiece supply/conveyance device 2 delivers an unmachined workpiece to the chuck at the front end of the spindle 3, receives a machined workpiece from the chuck, and unloads it from the machine tool 1.

The workpiece supply/conveyance device 2 includes an arm body 26 having a plurality of arms 24 radially projecting from a rotation center C1. The arm body 26 is arranged between the spindle 13 and the tool rest 12. Further, the arm body 26 is rotatably supported by a support section 20 fixed to the pedestal 11 above the spindle stock 10.

On the support section 20, a rotary shaft 20a which is rotated by a driving means not shown is arranged on an axial line of the rotation center C1 of the arms 24. The arm body 26 is disposed to the tip of this rotary shaft 20a.

The four arms 24 in the arm body 26 are provided at intervals of 90 degrees.

As shown in the enlarged view of FIG. 1(b), at the tip of each arm 24, an unmachined workpiece holding section 29 which delivers an unmachined workpiece to the spindle 13 and a machined workpiece holding section 21 which receives a machined workpiece from the spindle 13 are provided to be adjacent to each other.

All the unmachined workpiece holding sections 29 and all the machined workpiece holding sections 21 of all the arms 24, 24 . . . are arranged on a common circumference A having the rotation center C1 as the center. In this embodiment, the arm body 26 rotates in a counterclockwise direction (a direction indicated by an arrow in each of FIGS. 1(a) and (b)) as the machine tool 1 is seen from the front side, each machined workpiece holding section 21 is arranged on a downstream side of the rotating direction as seen from the spindle 13. On an upstream side of the same, each unmachined workpiece holding section 29 is arranged.

When one of the machined workpiece holding section 21 and the unmachined workpiece holding section 29 (e.g., the machined workpiece holding section 21) delivers and receives the workpiece to and from the chuck of the spindle 13, the machined workpiece holding section 21 and the unmachined workpiece holding section 29 are preferably provided as closely to each other as possible, so long as the workpiece held by the other thereof (e.g., the unmachined workpiece holding section 29) does not interfere with the spindle 13.

The arm body 26 is arranged in such a manner that an axial line C2 of the spindle 13 is placed on the circumference A. The arm body 26 is rotated around the rotation center C1 as an axial center by the driving means. The driving means can precisely rotate the arm body 26 as much as a preset rotation angle to position the same. As this type of driving means, a known driving means such as a servo motor, a stepping motor, or a motor having an encoder can be used.

The unmachined workpiece holding section 29 is formed in accordance with a shape or a dimension of the unmachined workpiece to enable holding the unmachined workpiece, and the machined workpiece holding section 21 is formed in accordance with a shape or a dimension of the machined workpiece to enable holding the machined workpiece.

Figure 3:
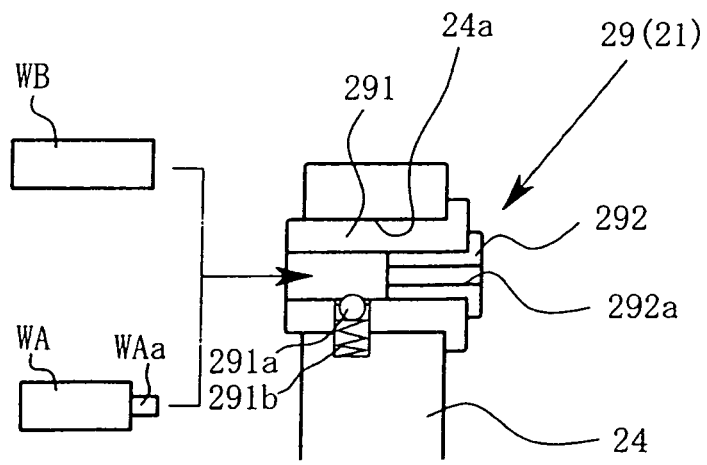
FIG. 3 is an enlarged cross-sectional view showing the tip portion of the arm on which an unmachined workpiece holding section and a machined workpiece holding section are provided.

FIG. 3 is an enlarged cross-sectional view of the tip portion of the arm 24. In this embodiment, an unmachined workpiece WB and a machined workpiece WA can be held by the machined workpiece holding section 21 and the machined workpiece holding section 29 having the same constitution. Therefore, the same reference numeral denotes the unmachined workpiece holding section 29 and the machined workpiece holding section 21, as both the sections are shown in FIG. 3. Furthermore, when it is necessary to discriminate the unmachined workpiece and the machined workpiece from each other in the following description, the unmachined workpiece is denoted by reference character "WB" and the machined workpiece is done by reference character "WA".

Each of the unmachined workpiece holding section 29 and the machined workpiece holding section 21 is fitted into a through hole 24a formed at the tip of the arm 24. Each section includes a cylindrical holder 291 having about the same internal diameter as an external diameter of each of the unmachined workpiece WB and the machined workpiece WA, and a stopper 292 which is fitted into this holder 291 from one side thereof and comes into contact with the unmachined workpiece WB or the machined workpiece WA to position the unmachined workpiece WB or the machined workpiece WA in the holder 291. Moreover, the stopper 292 is provided with a hole 292a into which a shaft portion WAa formed at the tip of the machined workpiece WA is inserted. In addition, the holder 291 may be provided with urging means constituted of such a ball 291a and a spring 291b as shown in the drawing so that each of the unmachined workpiece WB and the machined workpiece WA is not readily dropped off.

Thus, the machined workpiece WA can be delivered to the machined workpiece holding section 21, for example, by positioning the machined workpiece holding section 21 and the spindle 13 so as to be opposite to each other on one axial line, and then advancing the spindle 13 toward the arm 24 along the axial line to push the machined workpiece WA held by the chuck of the spindle 13 into the holder 291 of the machined workpiece holding section 21. Additionally, in a case where the machined workpiece WA cannot be sufficiently pushed into the holder 291 only by the advancing movement of the spindle 13, for example, a push rod which can pass through a through hole of the spindle 13 and can freely move forward and backward may be provided, and this push rod may be utilized to push the machined workpiece WA into the machined workpiece holding section 21.

Furthermore, the unmachined workpiece WB can be delivered from the unmachined workpiece holding section 29 to the spindle 13, for example, by positioning the unmachined workpiece holding section 29 and the spindle 13 so as to be opposite to each other on one axial line, advancing the spindle 13 having the opened chuck toward the arm 24 along the axial line, and inserting, into the chuck, the tip of the unmachined workpiece WB held by the unmachined workpiece holding section 29 in a state where a part of the tip projections, and then closing the chuck. Also in this case, when a length of the projected tip is not sufficient, for example, a push rod which can pass through the through hole of the holder 291 may be utilized to push out the unmachined workpiece WB toward the spindle 13.

The workpiece supply/conveyance device of the present invention may include one or both of a loading device which supplies the unmachined workpiece to the arm and an unloading device which receives the machined workpiece from the arm and unloads the same. When such a loading device or an unloading device is provided, continuous unmanned machining is possible for a long time.

In this embodiment, the workpiece supply/conveyance device 2 includes a loading device 27 which supplies, to the arm 24, the unmachined workpiece WB which is delivered to the spindle 13 and an unloading device 28 which conveys the machined workpiece WA delivered from the spindle 13 to the arm 24 to the outside of the machine tool 1.

As each of the loading device 27 which loads the unmachined workpiece and the unloading device 28 which unloads the machined workpiece, a known device such as a belt conveyer, a loader device, a robot hand, or a part feeder can be used.

When the driving means is driven, the arm body 26 can sequentially position each arm 24 to predetermined rotation angle positions, i.e., a workpiece delivery/reception position (indicated by reference numeral I in FIG. 1) at which the machined workpiece holding section 21 or the unmachined workpiece holding section 29 of the arm 24 faces the spindle 13, a machined workpiece unloading position (indicated by reference numeral II) at which the machined workpiece is delivered to the unloading device 28 from the machined workpiece holding section 21, an unmachined workpiece loading position (indicated by reference numeral III) at which the unmachined workpiece is supplied to the unmachined workpiece holding section 29 from the loading device 27, and a standby position (indicated by reference numeral IV) which is a position that is as close to the spindle 3 as possible on the upstream side in the rotating direction as seen from the spindle 13 and at which the spindle 13, the tool rest 12 and the tools T during the machining of the workpiece do not interfere with each other.

In this embodiment, when one arm 24 is placed at the standby position IV, two arms 24 in the three remaining arms are simultaneously placed at the machined workpiece unloading position II and the unmachined workpiece loading position III, and the other arm 24 is placed on the opposite side (indicated by reference numeral V in FIG. 1) of the arm 24 at the standby position IV over the spindle 13 as seen from the front side. The loading device 27 is arranged to face the unmachined workpiece holding section 29 of the arm 24 placed at the unmachined workpiece loading position III, and the unloading device 28 is arranged to face the machined workpiece holding section 21 of the arm 24 placed at the machined workpiece unloading position II.

Therefore, while the one arm 24 is standby at the standby position IV, the unmachined workpiece can be supplied to the other arm 24, and at the same time, the machined workpiece can be unloaded from the further other arm 24. Hence, no wasting time is present.

The machine tool 1 of this embodiment cuts, with the tools T, the workpiece held by the chuck of the spindle 13 while one arm 24 is standby at the standby position IV. At the standby position IV, since each arm 24 does not interfere with the spindle 13, the tool rest 12 and the tools T during the machining of the workpiece, the workpiece can be machined freely including the forward and backward movement of the spindle 13.

Next, a function of the workpiece supply/conveyance device 2 having the above-described constitution will be described with reference to FIGS. 4 to 6.

Figure 4:
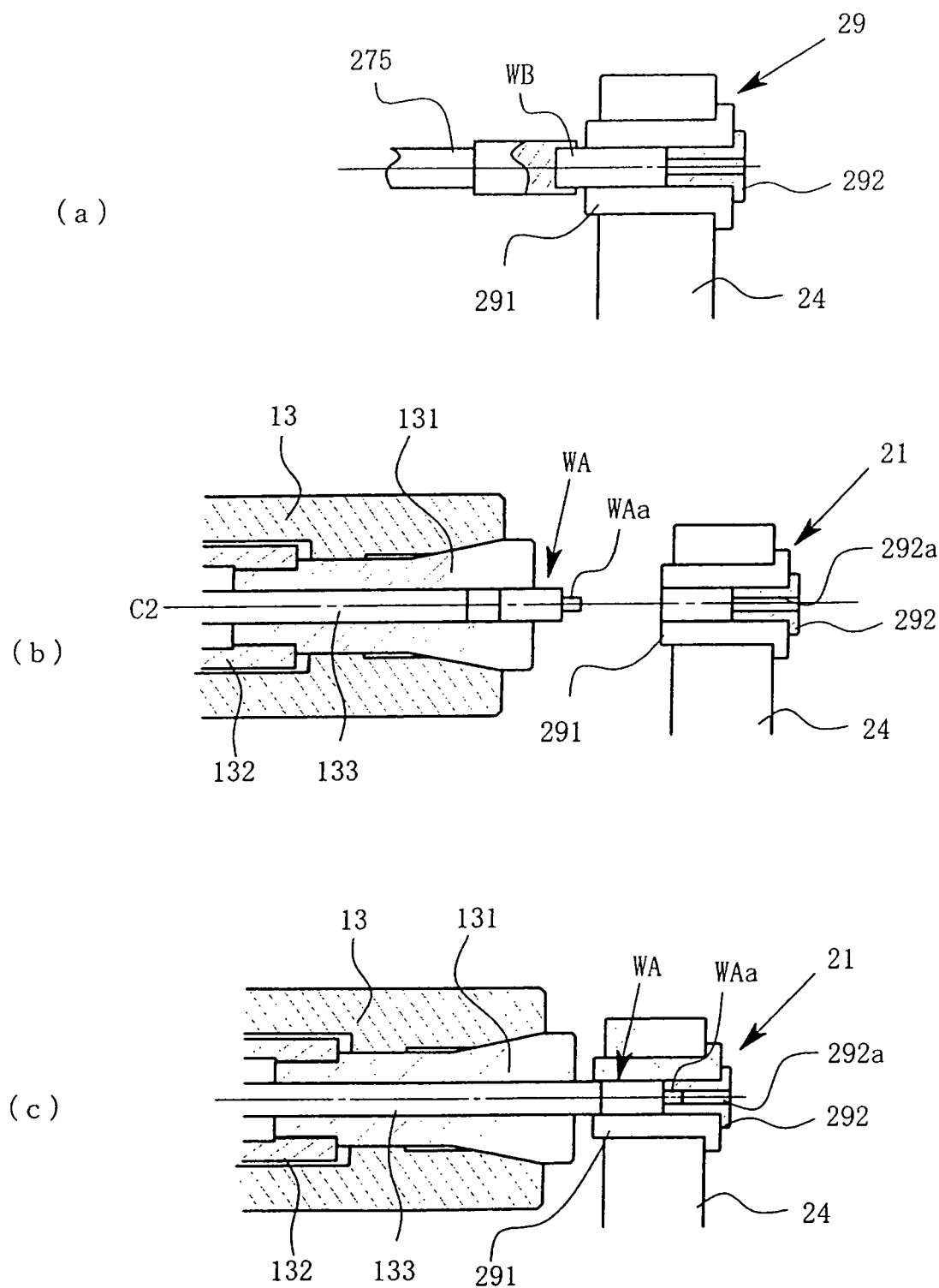
FIG. 4 is a view for explaining an operation of the reception of the unmachined workpiece from a loading device to the delivery of the machined workpiece to an unloading device.
Figure 5:
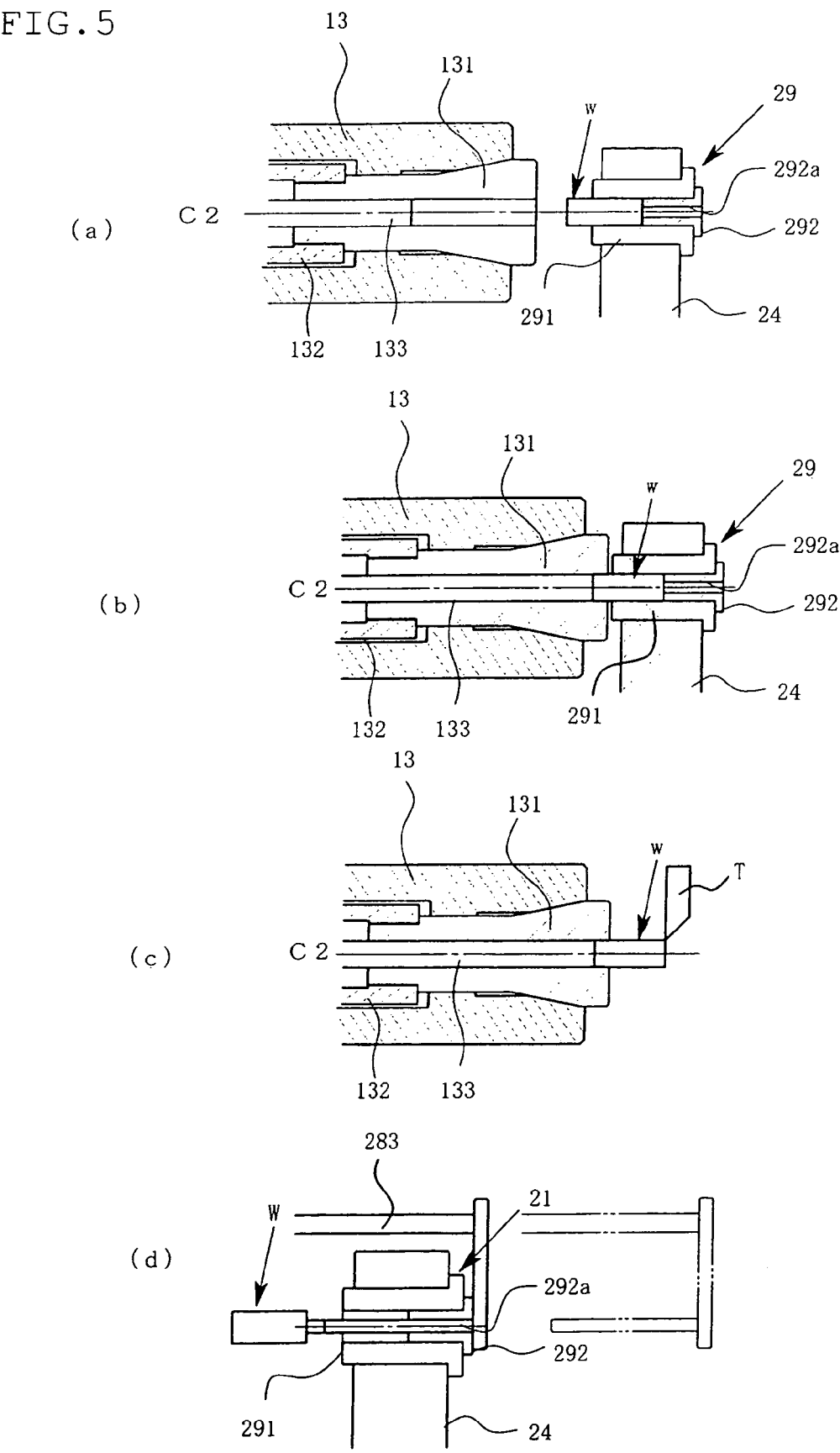
FIG. 5 is a view for explaining the operation of the reception of the unmachined workpiece from the loading device to the delivery of the machined workpiece to the unloading device.
Figure 6:
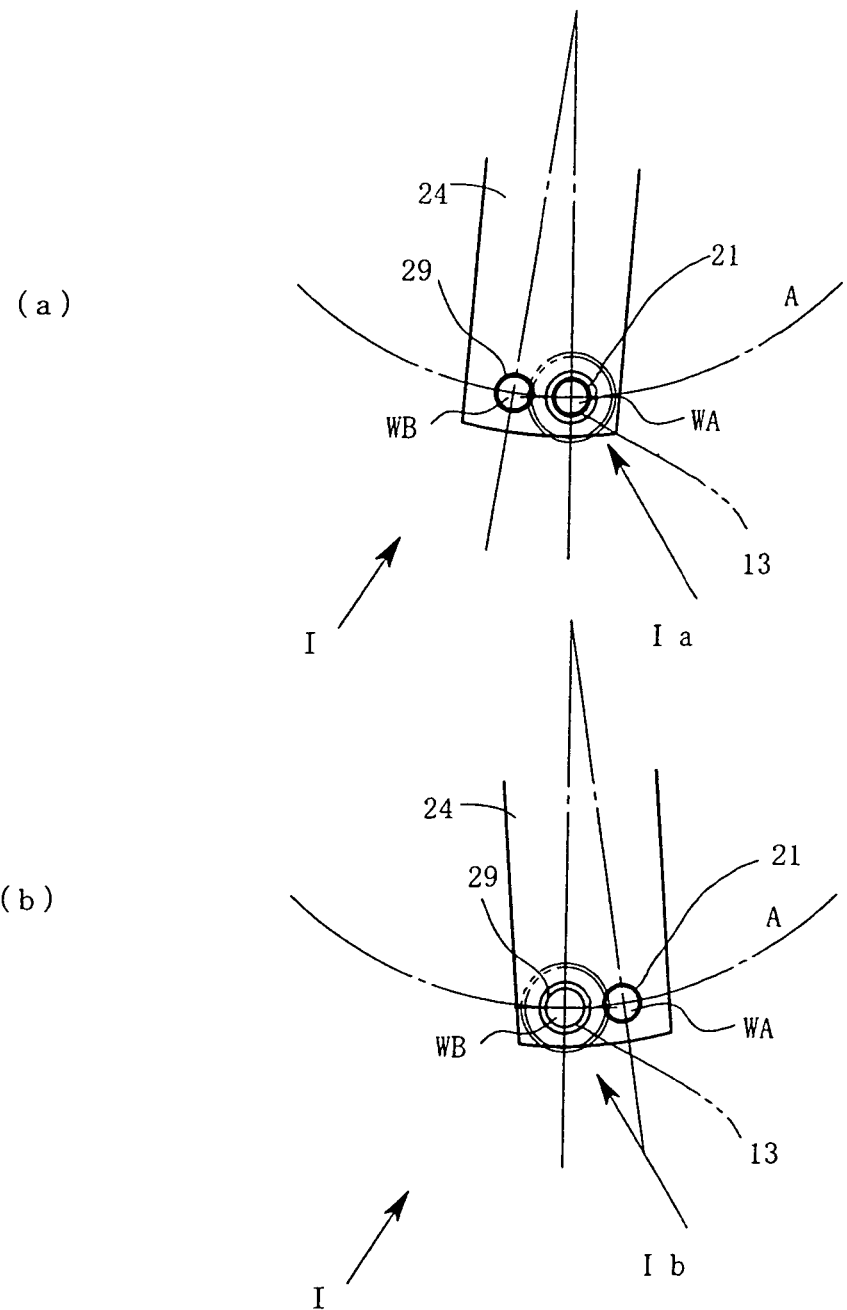
FIG. 6 is an enlarged front view of a main part for explaining a behavior of the rotation of the arm when delivering/receiving the workpiece between a spindle and the arm.

FIGS. 4 and 5 are views for explaining an operation of the reception of the unmachined workpiece from the loading device 27 to the delivery of the machined workpiece to the unloading device 28, and FIG. 6(a) and FIG. 6(b) are enlarged front views of a main part for explaining the behavior of the rotation of the arm 24 when delivering/receiving the workpiece between the spindle 13 and the arm 24.

In the following description, a state that one arm 24 is placed at the standby position IV as shown in FIG. 1(a) will be explained as an "initial state".

In this initial state, the workpiece is machined at the spindle 13. At the unmachined workpiece loading position III, the unmachined workpiece WB is supplied from the loading device 27 to the unmachined workpiece holding section 29 of the arm 24, and at the machined workpiece unloading position II, the machined workpiece WA is delivered from the machined workpiece holding section 21 to the unloading device 28, and then unloaded.

FIG. 4(a) shows a behavior that the unmachined workpiece WB is supplied from the loading device 27 to the unmachined workpiece holding section 29 of the arm 24. As shown in the drawing, the unmachined workpiece WB is pushed into the holder 291 of the unmachined workpiece holding section 29 by, e.g., a push rod 275 provided in the loading device 27 until the workpiece comes into contact with the stopper 292. It is to be noted that, for example, air pressure can be also utilized for the pushing, in addition to a push rod 133.

Since the unmachined workpiece WB is supplied to a workpiece supply section 29 when the arm 24 is placed at the unmachined workpiece loading position III, the arm 24 placed at the standby position IV holds the unmachined workpiece WB which is to be next machined during the standby at the standby position IV.

When machining the workpiece held by the chuck of the spindle 13 is terminated, the spindle 13 moves back to a position where the movement of the arm 24 is not obstructed. Then, the arm body 26 rotates to move the arm 24 placed at the standby position IV to the workpiece delivery/reception position I where it faces the spindle 13. The arm body 26 first places, on the axial line C2 of the spindle 13, the machined workpiece holding section 21 of the arm 24 placed at the workpiece delivery/reception position I, as shown in FIG. 4(a) and FIG. 6(a). A position of the arm 24 at this time is a workpiece reception position Ia.

Thereafter, the spindle 13 moves forward and uses the push rod 133 as required as described above to insert the tip of the machined workpiece WA into the holder 291 of the machined workpiece holding section 21.

In this embodiment, the push rod 133 is inserted and provided in a through hole of a draw bar 132 which moves forward and backward the chuck 131 of the spindle 13. This push rod 133 can move forward and backward along a direction of the axial line C2 of the spindle 13 by driving means such as a cylinder. In a state where the chuck 131 is opened, the push rod 133 can push the machined workpiece WA into the holder 291 until this workpiece reaches the stopper 292 as shown in FIG. 4(c). It is to be noted that the shaft portion WAa at the tip of the machined workpiece WA is placed in the hole 292a of the stopper 292.

When the machined workpiece WA is delivered to the holder 291 of the machined workpiece holding section 21, the spindle 13 moves back to a position where it does not interfere with the arm 24 in a state where the chuck 131 is opened. Thereafter, the arm body 26 rotates to place, on the axial line C2 of the spindle 13, the unmachined workpiece holding section 29 of the arm 24 placed at the workpiece delivery/reception position I, as shown in FIGS. 5(a) and 6(b). A position of the arm 24 at this time is a workpiece delivery position Ib. Then, as depicted in FIG. 5(b), the spindle 13 moves forward to place, in the opened chuck 131, the tip of the unmachined workpiece WB held by the unmachined workpiece holding section 29.

Afterward, when the chuck 131 is closed to hold the unmachined workpiece WB at the front end of the spindle 13, the spindle 13 moves back to the position where it does not interfere with the rotation of the arm 24.

In the workpiece supply/conveyance device 2 of the present invention, the machined workpiece holding section 21 and the unmachined workpiece holding section 29 are provided to the one arm 24 as closely to each other as possible so as to be adjacent to each other on the common circumference A, and hence the arm 24 placed at the workpiece delivery/reception position I can be moved from the workpiece reception position Ia to the workpiece delivery position Ib, by rotating the arm body 26 as much as a very small angle range, whereby a delivering state of the machined workpiece from the spindle 13 to the arm 24 can be switched to a delivering state of the unmachined workpiece from the arm 24 to the spindle 13. Therefore, there is an advantage that the reception of the workpiece from the spindle 13 and the delivery of the workpiece to the spindle 13 can be carried out in a short time.

When the delivery and the reception of the machined workpiece WA and the unmachined workpiece WB with respect to the spindle 13 are terminated, the arm body 26 rotates to place, at the standby position IV, the arm 24 placed at the workpiece supply position III in a state where the unmachined workpiece WB which is to be next machined is held. At this time, the arm 24 which has received the machined workpiece WA from the spindle 13 at the workpiece delivery/reception position I immediately before the rotation of the arm body 26 is placed at the position V, and the arm 24 which has been placed at the position V immediately before the rotation of the arm 26 and holds the machined workpiece WA is placed at the machined workpiece unloading position II.

The machining of the unmachined workpiece WA delivered from the arm 24 to the spindle 13 is started by the tools T on the tool rest 12 before and after the arm 24 holding the unmachined workpiece WB which is to be next machined reaches the standby position IV (see FIG. 5(c)).

At the machined workpiece unloading position II, the machined workpiece holding section 21 of the arm 24 holding the machined workpiece WA faces the unloading device 28, and hence, as shown in FIG. 5(d), the machined workpiece WA can be pushed out from the holder 291 and delivered to the unloading device 28 by, e.g., inserting the push rod 285 provided in the unloading device 28 into the holder 291.

As explained above, each arm 24 of the arm body 26 is sequentially switched to the workpiece delivery/reception position I, the workpiece ejection position II, the workpiece supply position III and the standby position IV to carry out the above-mentioned respective operations at the respective positions.

As understood from the above, the workpiece supply/conveyance device 2 of the present invention can readily perform the workpiece delivery operation by the rotation of the arm body 26, which enables the curtailment of a time from the end to the start of the machining of the workpiece (a cycle time) of the machine tool 1 by the workpiece delivery operation.

SECOND EMBODIMENT

FIGS. 7(a) and 7(b) are concerned with a second embodiment of the present invention, where (a) is a front view of a main part of a machine tool including a workpiece supply/conveyance device and (b) is a plan view of the same.

A workpiece supply/conveyance device of this embodiment includes two loading devices (a first loading device 30 and a second loading device 31) which supply different types of unmachined workpieces.

In this embodiment, the first loading device 30 is arranged at the same position as the loading device 27 of the foregoing embodiment, and the second loading device 31 is arranged at the same position as the unloading position 28 of the foregoing embodiment so as to face an unmachined workpiece holding section 29 of an arm 24. In the following description, a first unmachined workpiece loading position IIIa is a position which is on the downstream side in a rotating direction as seen from a spindle 13 and at which an unmachined workpiece is delivered to the unmachined workpiece holding section 29 of the arm 24 from the first loading device 30. Furthermore, a second unmachined workpiece loading position IIIb is a position which is on the upstream side of the position IIIa and at which an unmachined workpiece is delivered to the unmachined workpiece holding section 29 of the arm 24 from the second loading device 31.

In this embodiment, when three arms 24 in the four arms 24 are placed at a standby position IV, the first unmachined workpiece loading position IIIa and the second unmachined workpiece loading position IIIb, the unloading device 28 is arranged at a position where it can receive a machined workpiece from a machined workpiece holding section 21 of the one remaining arm 24 and unload the same.

Therefore, also in this embodiment, while one arm 24 holds an unmachined workpiece which is to be next machined and is standby at the standby position IV, it is possible to simultaneously carry out the supply of the unmachined workpiece from one of the first unmachined workpiece loading position IIIa and the second unmachined workpiece loading position IIIb to the arm 24 and the conveyance of a machined workpiece from the arm 24 to the unloading device 28.

Figure 7:
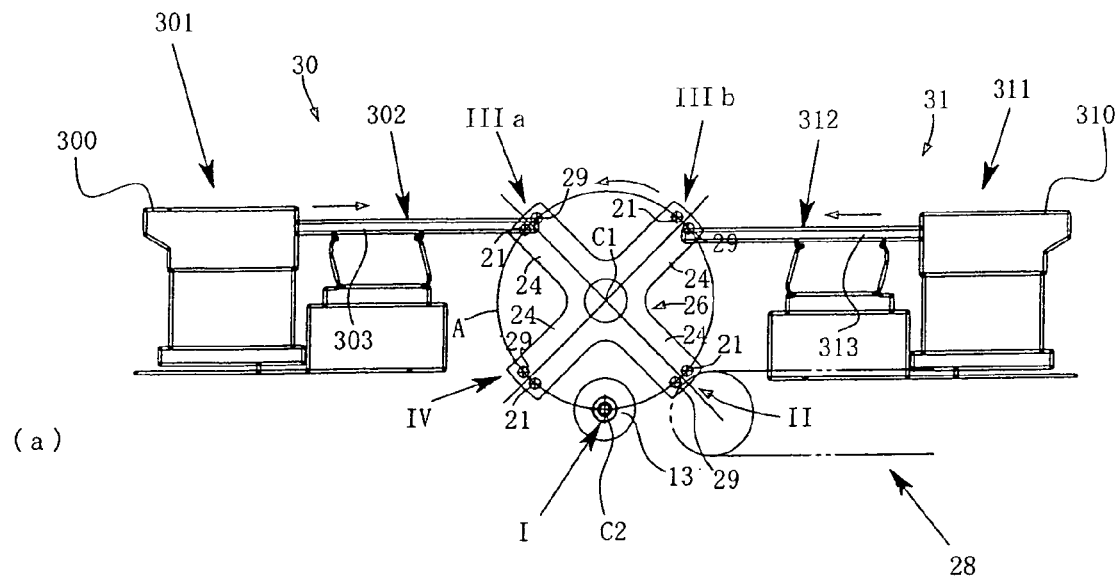
FIGS. 7(a) and 7(b) show a second embodiment of the present invention, where (a) is a front view of a main part of a machine tool including a workpiece supply/conveyance device and (b) is a plan view of the same.
Figure 7:
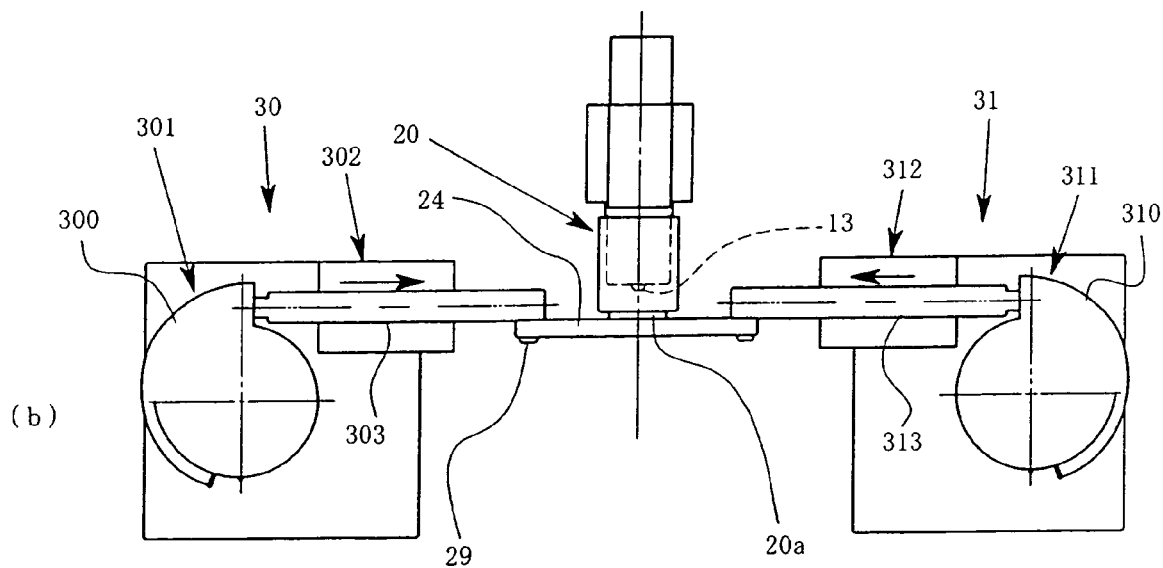

As the first loading device 30 and the second loading device 31, various kinds of devices can be used. Since the first loading device 30 and the second loading device 31 of this embodiment are arranged on left and right sides of an axial line C2 as a boundary, they have the same basic constitution except that they are symmetrical. As shown in FIG. 7, the first loading device 30 and the second loading device 31 have part feeders 301 and 311 including hoppers 300 and 310 which store a plurality of unmachined workpieces, and linear feeders 302 and 312 including linear guides 303 and 313 which linearly align the unmachined workpieces supplied from the part feeders 301 and 311 and guides each of the unmachined workpieces to a position near the unmachined workpiece holding section 29 of the arm 24 placed at the first unmachined workpiece loading position IIIa or the second unmachined workpiece loading position IIIb. The unmachined workpiece supplied to the tip of the linear feeder 302 or 312 is delivered to the unmachined workpiece holding section 29 of the arm 24 placed at the first unmachined workpiece loading position IIIa or the second unmachined workpiece loading position IIIb by, e.g., a push rod or robot hand not shown, or air pressure feed.

Figure 8:
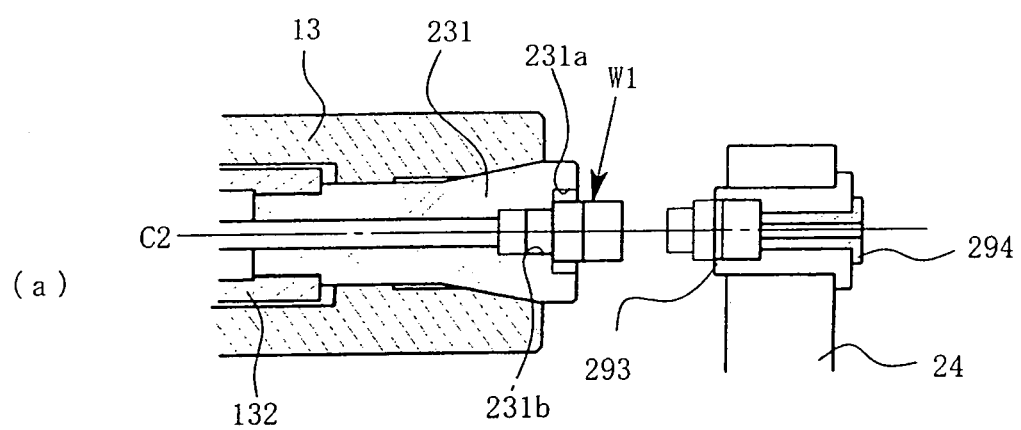
FIGS. 8(a) and 8(b) each is an enlarged cross-sectional view of the tip portion of a spindle in the machine tool according to the second embodiment of the present invention.
Figure 8:
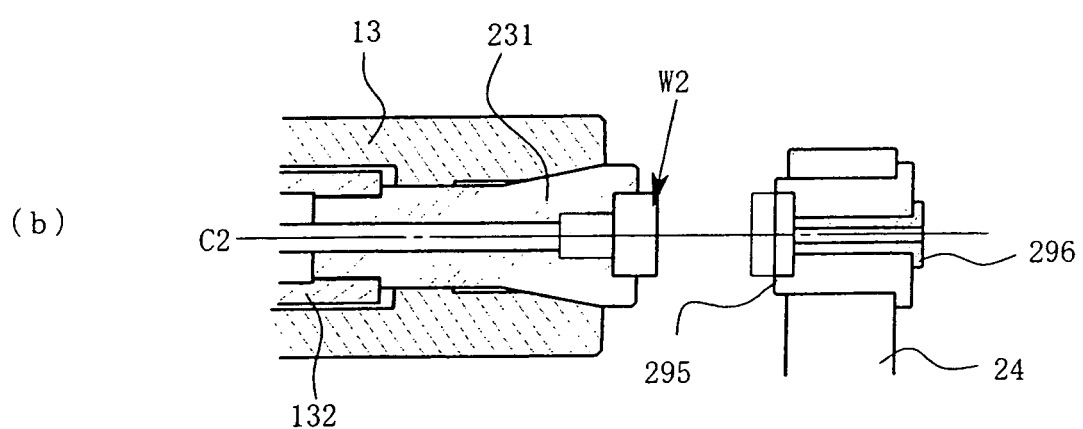

FIGS. 8(*a*) and 8(*b*) are enlarged cross-sectional views showing the spindle tip portion of a machine tool in this embodiment.

A grasping claw of a chuck 231 provided at the tip of the spindle 13 is formed into a stepped shape including a large diameter portion 231*a* and a small diameter portion 231*b*, and two types of workpieces W1 and W2 having different diameters can be grasped. That is, as shown in FIG. 8(*a*), the small diameter workpiece W1 can be grasped at the small diameter portion 231*b*, and as shown in FIG. 8(*b*), the large diameter workpiece W2 can be grasped at the large diameter portion 231*a*.

According to such a constitution, the first loading device 30 and the second loading device 31 separately supply the workpieces W1 and W2, and even if the workpiece to be machined is exchanged with a different type of workpiece, the chuck 231 does not have to be replaced.

In this case, as a holder and a stopper which are provided in the unmachined workpiece holding section 29 and the machined workpiece holding section 21, a holder 293 and a stopper 294 for the small diameter workpiece W1 are prepared, and a holder 295 and a stopper 296 for the large diameter workpiece W2 are prepared. In accordance with the changeover of the workpieces W1 and W2, the holder 293, the stopper 294, the holder 295 and the stopper 296 are replaced.

Next, a function of the workpiece supply/conveyance device of this embodiment will be described.

In the following, there will be described an example where an unmachined workpiece supplied from the first loading device 30 is first machined and then an unmachined workpiece supplied from the second loading device 31 is machined.

In a case where the unmachined workpiece supplied from the first loading device 30 is machined, the driving of the second loading device 31 is stopped. A procedure of supplying the unmachined workpiece to the arm 24 from the first loading device 30, delivering and receiving the unmachined workpiece and the machined workpiece with respect to the spindle 13, and delivering the machined workpiece to the unloading device 28 and unloading is the same as in the foregoing embodiment except that a position of the unloading device 28 (the machined workpiece unloading device II) is different.

When a workpiece switching command is output from an NC device of the machine tool 1 (see FIG. 1), the driving of the first loading device 30 is stopped, and the second loading device 31 is driven. When one arm 24 is at the standby position VI, the unmachined workpiece holding section 29 of the arm 24 placed at the second unmachined workpiece loading position IIIb is vacant, and hence the unmachined workpiece which is to be machined after the switching is supplied to this unmachined workpiece holding section 29 from the second loading device 31.

It is to be noted that, at this time, the arms 24 placed at the first unmachined workpiece loading position IIIa and the standby position IV hold unmachined workpieces before the switching, and hence, when the number of the remaining workpieces which are currently being machined is two, the switching command from the NC device is preferably output.

The workpiece supply/conveyance device of this embodiment is also useful, for example, in a case where the unmachined workpiece is performed to primary machining to form a semifinished product and then the semifinished product is further performed to secondary machining to provide a finished product.

THIRD EMBODIMENT

Figure 9:
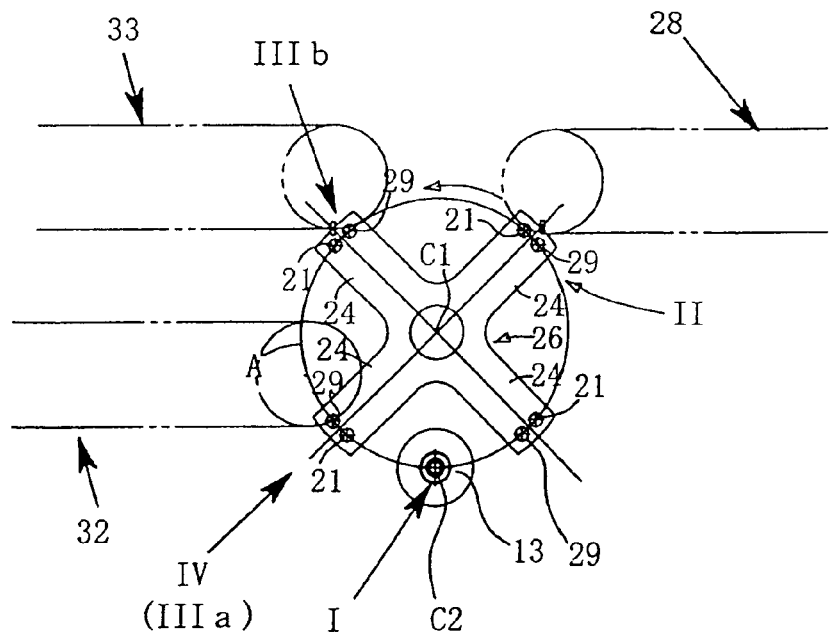
FIG. 9 shows a modification of the second embodiment according to a third embodiment of the present invention.

The arrangement of the first loading device, the second loading device and the unloading device is not restricted to the above constitution. FIG. 9 is concerned with a third embodiment of the present invention which is a modification of the second embodiment. In the third embodiment, the arrangement of the first loading device, the second loading device and the unloading device in the second embodiment is changed.

In this embodiment, a second loading device 33 is arranged at the same position as the loading device 27 in the first embodiment, and a unloading device 28 is arranged at the same position as the unloading device 28 in the first embodiment. It is to be noted that the unloading device 28 may be provided at the same position as the unloading device 28 in the second embodiment. Further, a first loading device 32 is provided so as to face an unmachined workpiece holding section 29 of an arm 24 placed at a standby position IV.

Also in this embodiment, a first unmachined workpiece loading position IIIa is a position which is on the downstream side in a rotating direction as seen from a spindle 13 and at which an unmachined workpiece is delivered to the unmachined workpiece holding section 29 of the arm 24 from the first loading device 32. Furthermore, a second unmachined workpiece loading position IIIb is a position which is on the upstream side of the position IIIa and at which an unmachined workpiece is delivered to the unmachined workpiece holding section 29 of the arm 24 from the second loading device 31. The first unmachined workpiece loading position IIIa is also the standby position IV.

The workpiece supply/conveyance device of this embodiment functions in the same manner as the workpiece supply/conveyance device of the second embodiment. It is to be noted that, in this embodiment, the arm 24 placed at the standby position IV (the first unmachined workpiece loading position IIIa) holds an unmachined workpiece before switching, and hence, when the number of the remaining workpiece which is currently being machined is one, the switching command from the NC device is preferably output.

FOURTH EMBODIMENT

Figure 10:
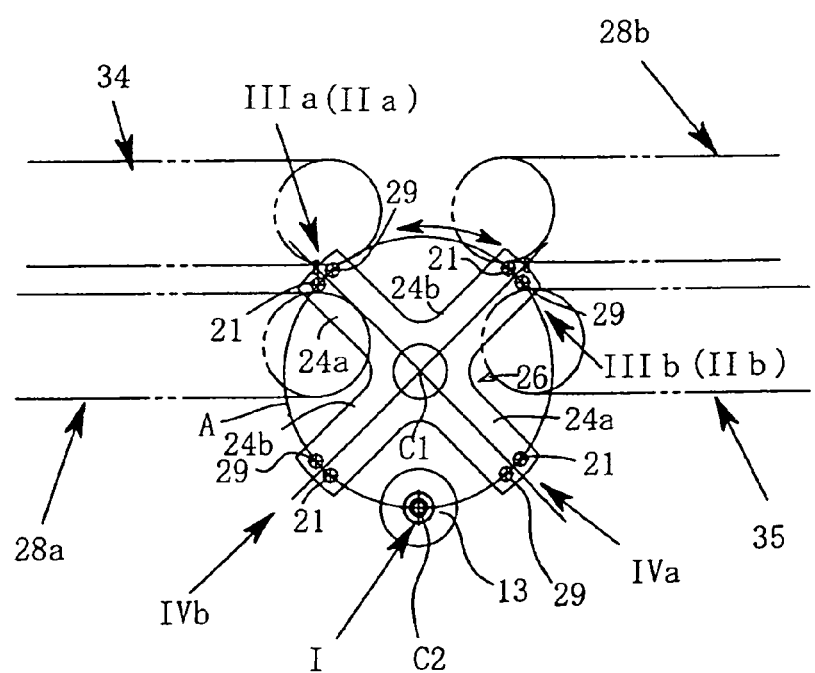
FIG. 10 shows another modification of the second embodiment according to a fourth embodiment of the present invention.

FIG. 10 is concerned with a fourth embodiment of the present invention which is another modification of the workpiece supply/conveyance device of the second embodiment.

In this embodiment, a first loading device 34 is provided to face an unmachined workpiece holding section 29 of an arm 24 placed at a first unmachined workpiece loading device IIIa, and a first unloading device 28a is provided to face a machined workpiece holding section 21 of the arm 24 placed at the first unmachined workpiece loading position IIIa. In this embodiment, the first unmachined workpiece loading position IIIa is also a first machined workpiece unloading position IIa.

Furthermore, a second loading device 35 is provided to face the unmachined workpiece holding section 29 of the arm 24 placed at a second unmachined workpiece loading position IIIb, and a second unloading device 28b is provided to face the machined workpiece holding section 21 of the arm 24 placed at the second unmachined workpiece loading position IIIb. In this embodiment, the second unmachined workpiece loading position IIIb is also a second machined workpiece unloading position IIb.

Moreover, the 4 arms provided to an arm body 26 is divided into two pairs of arms (arms 24a and 24b and arms 24b and 24b) placed on the same axial lines so that one pair of arms 24a and 24a receive an unmachined workpiece from the first loading device 34 and the other pair of arms 24b and 24b receive an unmachined workpiece from the second loading device 35.

In this embodiment, a first unmachined workpiece loading position IIIa is a position which is on the downstream side in a rotating direction as seen from a spindle 13 and at which an unmachined workpiece is delivered to the unmachined workpiece holding section 29 of the arm 24a from the first loading device 34. Further, a second unmachined workpiece loading position IIIb is a position which is on the upstream side of the position IIIa and at which an unmachined workpiece is delivered to the unmachined workpiece holding section 29 of the arm 24b from the second loading device 35. Additionally, the first unmachined workpiece loading position IIIa in this embodiment is also the first machined workpiece unloading position IIa at which the first unloading device 28a receives a machined workpiece from the machined workpiece holding section 21 and unloads the same, and the second unmachined workpiece loading position IIIb is also the second machined workpiece unloading position IIb at which the second unloading device 28b receives a machined workpiece from the machined workpiece holding section 21 of the arm 24b and unloads the same.

Further, a second standby position IVb for the arm 24b holding an unmachined workpiece is provided at the same position as the standby position IV according to each of the first to third embodiments, and a first standby position IVa is provided at a position where the arm 24a is stopped when the three arms 24a, 24b, and 24b are placed at the first unmachined workpiece loading position IIIa, the second unmachined workpiece loading position IIIb, and the second standby position IV.

In this embodiment, the arm body 26 can rotate in a clockwise direction and a counterclockwise direction.

The workpiece supply/loading device of this embodiment functions as follows.

An unmachined workpiece is supplied to each of the arms 24a and 24a from the first loading device 34. Furthermore, an unmachined workpiece is supplied to each of the arms 24b and 24b from the second loading device 35.

While a workpiece is being machined by the spindle 13, the arms 24a and 24b holding unmachined workpieces are standby at the standby positions IVa and IVb, respectively.

For example, when a workpiece which is to be machined this time is an unmachined workpiece held by the arm 24b, the arm body 26 is rotated in the counterclockwise direction to move the arm 24b in a standby state at the second standby position IVb to a workpiece delivery/reception position I facing the spindle 13. A workpiece delivering/receiving operation of the spindle 13 and the arm 24b at the work delivery/reception position I is as described above.

Then, the arm body 26 is rotated in the counterclockwise direction to cause the arm 24b holding a machined workpiece to pass the first standby position Iva from the workpiece delivery/reception position I and to move to the second unloading position IIb. Moreover, when a workpiece is being machined by using the spindle 13, an operation of delivering the machined workpiece to the second unloading device 28b from the machined workpiece holding section 21 of the arm 24b and an operation of supplying the unmachined workpiece from the second loading device 35 to the unmachined workpiece holding section 29 are carried out.

Thereafter, the arm 24b is sequentially rotated to the second standby position IVb, the delivery/reception position I, and the second unmachined workpiece loading position IIIb in the counterclockwise direction to repeat the loading and the machining of unmachined workpieces and the unloading of machined workpieces.

When a workpiece which is to be next machined is an unmachined workpiece held by the arm 24a, the arm body 26 is first rotated in the counterclockwise direction so that the arm 24b which is standby at the second standby position IVb is placed at the workpiece delivery/reception position I, and a machined workpiece is received by the machined workpiece holding section 29 from the spindle 13. Then, the arm body 26 is rotated in the clockwise direction to move the arm 24a in a standby state at the first standby position Iva to the workpiece delivery/reception position I facing the spindle 13, and an unmachined workpiece is delivered to the spindle 13. Then, the arm body 26 is rotated in the clockwise direction to cause the arm 24a holding a machined workpiece to pass the second standby position IVb from the workpiece delivery/reception position I and to move the same to the first unloading position IIa. Further, when the workpiece is being machined by using the spindle 13, an operation of delivering the machined workpiece to the first unloading device 28a from the machined workpiece holding section 21 of the arm 24a and an operation of supplying the unmachined workpiece from the first loading device 34 to the unmachined workpiece holding section 29 are carried out.

Thereafter, the arm 24a is sequentially rotated to the first standby position Iva, the delivery/reception position I, and the second unmachined workpiece loading position IIIa in the clockwise direction to repeat the loading and the machining of unmachined workpieces and the unloading of machined workpieces.

As explained above, in the workpiece supply/conveyance device of this embodiment, while different types of workpieces are held by the arms 24a and 24b and are standby at the first standby position IVa and the second standby position IVb and when a switching command is issued, the arm 24a or the arm 24b which are standby at the first standby position IVa or the second standby position IVb can be immediately moved to the workpiece delivery/reception position, and the workpiece can be supplied to the spindle 13, machined, and then unloaded.

In the workpiece supply/conveyance device of this embodiment, like the second and third embodiments, a predetermined number of one type of workpieces in different types of workpieces can be continuously machined and then a predetermined number of the other type of workpieces can be continuously machined, or different types of workpieces can be alternately machined.

FIFTH EMBODIMENT

Figure 11:
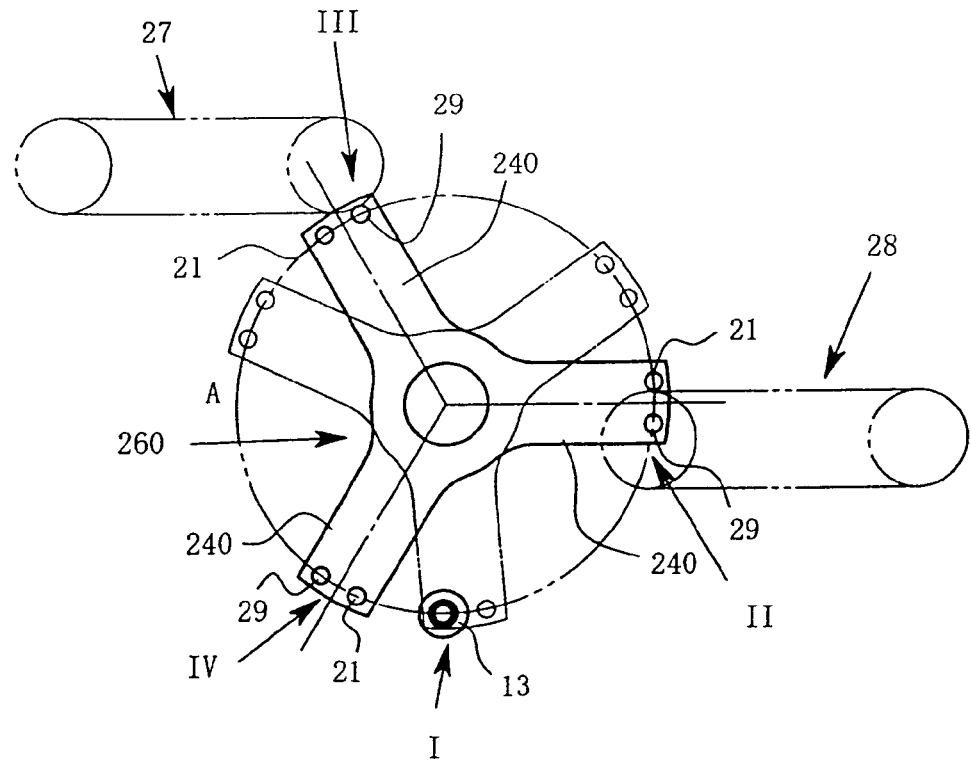
FIG. 11 is a front view for explaining a constitution of an arm body according to a fifth embodiment of the present invention.

FIG. 11 is concerned with a fifth embodiment of the present invention, and it is a front view for explaining a constitution of an arm body.

It is to be noted that like reference numerals denote members or parts equal to these in the foregoing embodiment in the following description, thereby omitting a detailed explanation thereof.

In this embodiment, 3 arms 240 are provided to an arm body 260 at equal intervals (intervals of 120°). At the tip of the arm 240, an unmachined workpiece holding section 29 and a machined workpiece holding section 21 are provided on the same circumference A like the arm 24 in the foregoing embodiments.

In FIG. 11, when one arm 240 is standby at a standby position IV, one of the other two arms 240 and 240 is placed at a machined workpiece unloading position II, and a remaining arm is placed at a unmachined workpiece loading position III. An unmachined workpiece WB is supplied from a loading device 27 to the unmachined workpiece holding section 29 at the unmachined workpiece loading position III, and a machined workpiece is delivered from the machined workpiece holding section 21 to an unloading device 28 at the machined workpiece unloading position II to be unloaded. The unmachined workpiece WB supplied from a loading device 27 is held by the unmachined workpiece holding section 29 of the arm 240 placed at the standby position IV.

Upon terminating the machining of a workpiece at a spindle 13, the arm body 260 rotates in the counterclockwise direction by the same procedure as described above to move the arm 240 placed at the standby position IV to a workpiece delivery/reception position I (a moved state is indicated by a virtual line). At this time, the machined workpiece and the unmachined workpiece. WB are delivered/received between the arm 240 and the spindle 13 in the same manner as in the preceding embodiments. When this delivery/reception is terminated, the arm body 260 rotates in the counterclockwise direction to move the arm 240 holding the machined workpiece to the machined workpiece unloading position II. At this time, the other two arms 240 are placed at the unmachined workpiece loading position III and the standby position IV.

SIXTH EMBODIMENT

Figure 12:
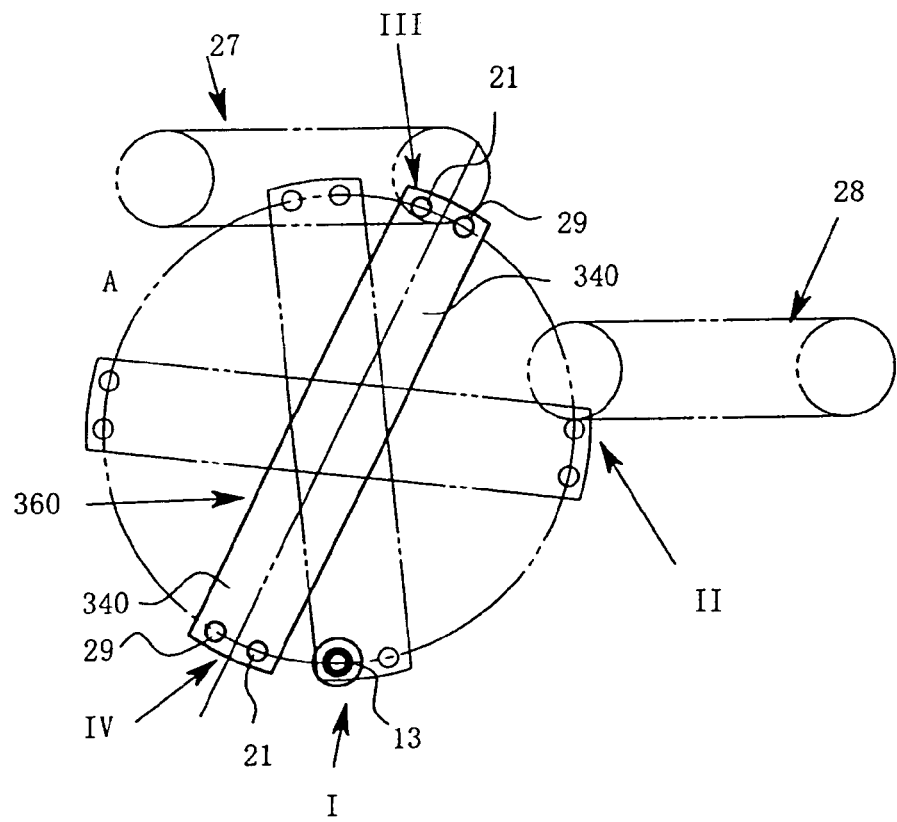
FIG. 12 is a front view for explaining a constitution of an arm body according to a sixth embodiment of the present invention.

FIG. 12 is concerned with a sixth embodiment of the present invention, and it is a front view for explaining a constitution of an arm body.

It is to be noted that like reference numerals denote members or parts equal to those of the foregoing embodiments in the following description, thereby omitting a detailed explanation thereof.

In this embodiment, two arms 340 are provided to an arm body 360 at equal intervals (intervals of 180°). At the tip of the arm 340, like the arms 24 and 240 in the foregoing embodiments, an unmachined workpiece holding section 29 and a machined workpiece holding section 21 are provided on a circumference A.

In FIG. 12, when one arm 340 is standby at a standby position IV, the other arm 340 is placed at a workpiece supply position III. Further, an unmachined workpiece WB is supplied to the unmachined workpiece holding section 29 from a loading device 27.

The unmachined workpiece holding section 29 of the arm 340 placed at the standby position IV holds the unmachined workpiece WB supplied from the loading device 27.

Upon termination of the machining of a workpiece by using a spindle 13, when the arm body 360 rotates in the counterclockwise direction to move one arm 340 placed at the standby position IV to a workpiece delivery/reception position I (a moved state is indicated by a virtual line), the delivery/reception of the machined workpiece and the unmachined workpiece WB is carried out between the arm 340 and the spindle 13.

When the delivery/reception of the machined workpiece and the unmachined workpiece WB is terminated between the spindle 13 and the arm 340, the arm body 360 rotates to move the arm 340 holding a machined workpiece WA at the workpiece holding section 21 to a machined workpiece unloading position II (a moved state is indicated by a virtual line). Furthermore, when the unmachined workpiece WB is being machined by using the spindle 13, the machined workpiece WA is delivered from the machined workpiece holding section 21 to the unloading device 28 to be unloaded. Thereafter, the arm body 360 rotates to place the other arm 340 holding the unmachined workpiece WB to be machined at a standby position IV. At this time, one arm 340 is placed at a workpiece supply position III to supply the unmachined workpiece WB from the unloading device 27.

In this embodiment, although not shown in particular, the unloading device 28 may be arranged so that when the one arm 340 is standby at the standby position IV, the other arm 340 is placed at the machined workpiece unloading position II. In this case, when the one arm 340 is standby at the position IV, the other arm 340 delivers the machined workpiece WA to the unloading device 28. Moreover, when the delivery/reception of the workpieces WA and WB is terminated between the spindle 13 and the one arm 340, the arm body 360 rotates to place the other arm 340 at the unmachined workpiece loading position III. At this time, the machining of the unmachined workpiece WB is started at the spindle 13.

When the machining of the unmachined workpiece WB is being carried out by using the spindle 13, the unmachined workpiece WB is delivered from the loading device 27 to the other arm 340. Then, the arm body 360 rotates to place the other arm 340 holding the unmachined workpiece WB at the standby position IV and also place the one arm 340 holding the machined workpiece WA at the machined workpiece unloading position II.

Figure 13:
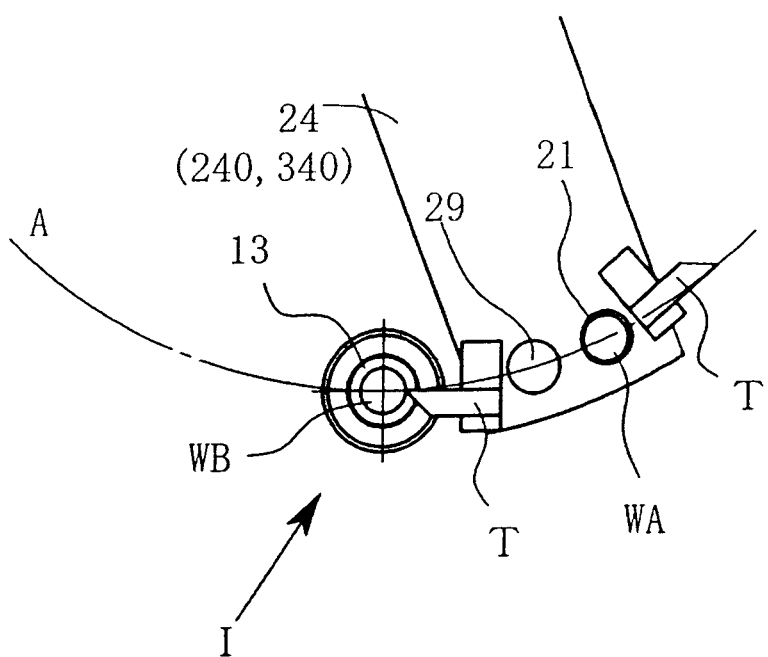
FIG. 13 is an enlarged view of the tip portion of an arm having a tool attached thereto.

Furthermore, as shown in FIG. 13, tools T to cut a workpiece W can be disposed to the arms 24, 24a, 24b, 240 and 340 in each foregoing embodiment, respectively. Although the tools T can be disposed to one of the upstream side and the downstream side in a rotating direction of the arm 24, 24a, 24b, 240, or 340, they may be disposed to both the sides as shown in the drawing. Additionally, placing blade edges of the tools T on the circumference A is sufficient.

When such a constitution is adopted to oscillate the arm 24, 24a, 24b, 240, or 340 with respect to the workpiece W, the machining of the workpiece W can be performed by using the tools T disposed to the arm 24, 24a, 24b, 240, or 340. It is to be noted that the arm 24, 24a, 24b, 240, or 340 utilized for the machining may be in a standby mode in which it holds the unmachined workpiece WB, or each arm may hold the machined workpiece WA received from the spindle 13.

Although the suitable embodiments of the present invention have been described, the present invention is not restricted to the foregoing embodiments.

For example, the description has been given as to the structure where the arm body has the 2 to 4 arms arranged at equal intervals in the above description, but the number of arms may be 5 or above.

Further, although the description has been given as to the structure where each of the unmachined workpiece holding section 29 and the machined workpiece holding section 21 inserts a workpiece into the cylindrical holder 291, a structure where the unmachined workpiece holding section 29 and the machined workpiece holding section 21 can hold an unmachined workpiece and a machined workpiece is sufficient, and various kinds of structures based on, e.g., air suction or magnetic attachment can be adopted.

Furthermore, although the description has been given as to the constitution where the machining is performed while switching different types of workpieces in the second to fourth embodiments, a constitution where the same type of workpieces are supplied from the plurality of loading devices can be adopted so that a workpiece can be immediately supplied from one of the other loading devices even if a trouble such as lack of a workpiece in one loading device or clogging of a workpiece occurs, thereby enabling a continuous operation for a long time.

INDUSTRIAL APPLICABILITY

The workpiece supply/conveyance device according to the present invention can be applied to not only a machine tool but all workpiece machining apparatus which perform a predetermined operation to a workpiece, e.g., an assembling machine or an inspection device.

The invention claimed is:

1. A workpiece supply/conveyance device, comprising:
   a workpiece machining apparatus configured to machine an unmachined workpiece and produce a machined workpiece;
   an unmachined workpiece loading position configured to receive the unmachined workpiece;
   a workpiece delivery/reception position at which the workpiece machining apparatus receives the unmachined workpiece and unloads the machined workpiece; and
   a plurality of arms radially extending from a rotation center, configured to integrally rotate in only one direction around the rotation center, and move the unmachined workpiece from the unmachined workpiece loading position to the workpiece delivery/reception position,
   wherein a tip of each of the plurality of arms comprises
      an unmachined workpiece holding section configured to hold the unmachined workpiece at an upstream side of the one direction, and
      a machined workpiece holding section configured to hold the machined workpiece at a downstream side of the one direction, and
   the plurality of arms only rotates in the one direction so that one of the plurality of arms unloads the unmachined workpiece to the workpiece machining apparatus from the unmachined workpiece holding section after the one of the plurality of arms received the machined workpiece on the machined workpiece holding section from the workpiece machining apparatus at the workpiece delivery/reception position.

2. The workpiece supply/conveyance device according to claim 1, further comprising, a machined workpiece unloading position configured to unload the machined workpiece,
   wherein the plurality of arms further comprises as first arm and a second arm,
   the first arm is positioned at the unmachined workpiece loading position and the second arm is positioned at the machined workpiece unloading position simultaneously, and
   while the unmachined workpiece is machined, another unmachined workpiece is loaded to the first arm and the machined workpiece is unloaded from the second arm.

3. The workpiece supply/conveyance device according to claim 2, wherein when the unmachined workpiece loading position and the machined workpiece unloading position are positioned such that one of the arms receives the machined workpiece from the workpiece machining apparatus at the workpiece delivery/reception position and unloads the machined workpiece at the machined workpiece unloading position.

4. The workpiece supply/conveyance device according to claim 1, further comprising a standby position at which the unmachined workpiece stands by to move onto the workpiece machining apparatus between the unmachined workpiece loading position and the workpiece delivery/reception position,
   wherein the plurality of arms further comprises a first arm and a second arm,
   the first arm is positioned at the unmachined workpiece loading position and the second arm is positioned at the standby position simultaneously, and
   while the unmachined workpiece is machined at the workpiece machining apparatus, a first another unmachined workpiece is loaded to the first arm at the unmachined workpiece loading position and the second arm holding a second another unmachined workpiece is positioned at the standby position.

5. The workpiece supply/conveyance device according to claim 4, further comprising a machined workpiece unloading position present between the standby position and the unmachined workpiece loading position,
   wherein the plurality of arms further comprises a third arm,
   when the first arm is positioned at the unmachined workpiece loading position and the second arm is positioned at the standby position, the third arm is positioned at the machined workpiece unloading position.

6. A machine tool, comprising:
   a spindle configured to hold an unmachined workpiece;
   a tool rest having a tool configured to machine the unmachined workpiece held by the spindle; and
   a workpiece supply/conveyance device configured to receive the unmachined workpiece from the spindle, comprising
      a workpiece machining apparatus configured to machine the unmachined workpiece and produce a machined workpiece,
      an unmachined workpiece loading position configured to receive the unmachined workpiece,
      a workpiece delivery/reception position at which the workpiece machining apparatus receives the unmachined workpiece and unloads the machined workpiece,
      a machined workpiece unloading position, configured to unload the machined workpiece, and a plurality of integrally rotatable arms configured to rotate in only one direction around a rotation center and hold the unmachined workpiece and the machined workpiece, and radially extending from the rotation center, wherein a tip of each of the plurality of arms comprises
an unmachined workpiece holding section configured to hold the unmachined workpiece at an upstream side of the one direction, and
a machined workpiece holding section configured to hold the machined workpiece at a downstream side of the one direction, the plurality of arms rotates in the only one direction passing through the unmachined workpiece loading position, the workpiece delivery/reception position, and the machined workpiece unloading position, when one of the plurality of the arms holding the unmachined workpiece is positioned at the workpiece delivery/reception position, the unmachined workpiece is unloaded to the workpiece machining apparatus, and the plurality of arms rotates in the only one direction so that the one of the plurality of arms unloads the unmachined workpiece to the workpiece machining apparatus from the unmachined workpiece holding section after the one of the plurality of arms received the machined workpiece on the machined workpiece holding section from the workpiece machining apparatus at the workpiece delivery/reception position.

7. The machine tool according to claim 6, wherein the plurality of arms further comprises a first arm and a second arm, the first arm is positioned at the unmachined workpiece loading position and the second arm is positioned at the machined workpiece unloading position simultaneously, and while the unmachined workpiece is machined, another unmachined workpiece is loaded to the first arm and the machined workpiece is unloaded from the second arm.

8. The machine tool according to claim 6, wherein the workpiece supply/conveyance device further comprises a standby position at which the unmachined workpiece stands by to move onto the workpiece machining apparatus between the unmachined workpiece loading position and the workpiece delivery/reception position, the plurality of arms further comprises a first arm and a second arm, the first arm is positioned at the unmachined workpiece loading position and the second arm is positioned at the standby position simultaneously, and while the unmachined workpiece is machined at the workpiece machining apparatus, first another unmachined workpiece is loaded to the first arm at the unmachined workpiece loading position and the second arm holding second another unmachined workpiece is positioned at the standby position.

9. The machine tool according to claim 8, wherein the machined workpiece unloading position is present between the standby position and the unmachined workpiece loading position, the plurality of arms further comprises a third arm, and when the first arm is positioned at the unmachined workpiece loading position and the second arm is positioned at the standby position, the third arm is positioned at the machined workpiece unloading position.

10. The machine tool according to claim 6, further comprising, at the unmachined workpiece loading position, an unloading device configured to unload the machined workpiece from the one of the plurality of arms which received the machined workpiece from the workpiece machining apparatus at the workpiece delivery/reception position.

11. The machine tool according to claim 6, further comprising a plurality of loading devices configured to load a plurality of kind of workpieces, wherein the plurality of loading devices switches a kind of the plurality of kind of workpieces supplied in order to machine the plurality of kind of workpieces.

12. The machine tool according to claim 6, wherein the plurality of arms comprises another tool, and the unmachined workpiece is machined by the another tool by a swing operation of the plurality of arms.

\* \* \* \* \*

UNITED STATES PATENT AND TRADEMARK OFFICE
CERTIFICATE OF CORRECTION

| | |
|---|---|
| PATENT NO. | : 8,881,627 B2 |
| APPLICATION NO. | : 12/452212 |
| DATED | : November 11, 2014 |
| INVENTOR(S) | : Masaaki Masuda |

It is certified that error appears in the above-identified patent and that said Letters Patent is hereby corrected as shown below:

In the Claims

Please change column 18, line 55, from "...receive the unmachined workpiece from the spindle,..." to --receive the machined workpiece from the spindle,--.

Signed and Sealed this
Twenty-fourth Day of March, 2015

Michelle K. Lee
*Director of the United States Patent and Trademark Office*